United States Patent [19]
Cohen et al.

[11] 3,742,306
[45] June 26, 1973

[54] CORE BALANCE EARTH LEAKAGE PROTECTIVE SYSTEMS

[75] Inventors: Vivian Cohen, Johannesburg; Sidney Charles Slocombe, Brakpan, both of South Africa

[73] Assignee: Fuchs Electrical Industries (Proprietary) Limited, Transvaal, South Africa

[22] Filed: Oct. 3, 1972

[21] Appl. No.: 294,564

[52] U.S. Cl. .............................. 317/18 D, 317/27 R
[51] Int. Cl. ............................................. H02h 3/28
[58] Field of Search ........................ 317/18 D, 27 R

[56] References Cited
UNITED STATES PATENTS

| | | |
|---|---|---|
| 3,548,259 | 12/1970 | McDonald .................... 317/18 D |
| 3,558,980 | 1/1971 | Florance et al. .................. 317/18 D |
| 3,566,189 | 2/1971 | Wilson et al. ..................... 317/18 D |
| 3,668,470 | 6/1972 | Ambler et al. .................... 317/18 D |

*Primary Examiner*—James D. Trammell
*Attorney*—Ostrolenk, Faber, Gerb & Soffen

[57] ABSTRACT

A core balance earth leakage protective system including a magnetic core; first and second sensing windings on the core; an electronic amplifier, the input to the amplifier being connected to the first sensing winding on the core and the output from the amplifier being electro-magnetically coupled with the core; a polarized magnetic relay including an actuating coil which is connected to the second sensing winding on the core, the relay being operative to cause isolation of load windings associated with the core when the current through the relay coil exceeds a predetermined value.

10 Claims, 1 Drawing Figure

3,742,306
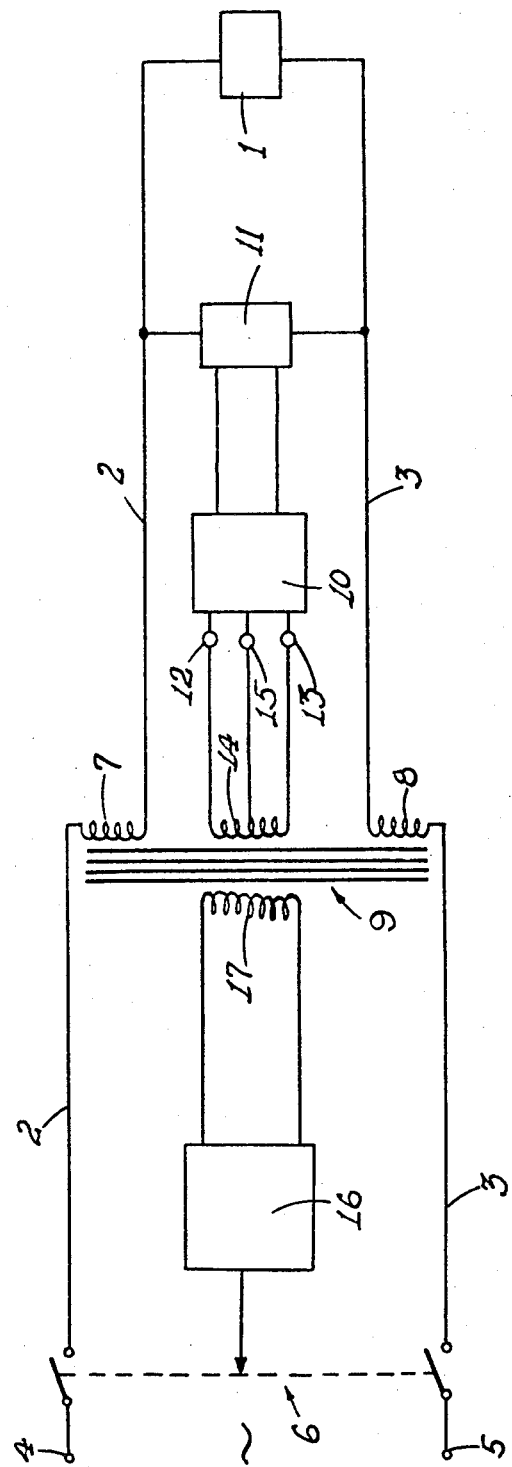

CORE BALANCE EARTH LEAKAGE PROTECTIVE SYSTEMS

This invention relates to core balance earth leakage protective systems.

At the present time, earth leakage protective devices generally fall into either of two basic classes, namely:

a. the transistorized electronic type, or b. the polarized relay type.

Irrespective of type, all earth leakage protective devices normally include three fundamental circuit components, namely:

i. a monitor comprising a toroidal magnetic core, usually of the low loss-high permeability type, and a sensing winding on the core to transmit a monitored earth fault signal to an amplifier, and ii. an amplifier comprising either a transistorized electronic amplifier or a polarized magnetic relay, depending on the basic class to which the device belongs, and iii. a tripping device which normally comprises a circuit breaker or on-load switch which is operated indirectly via an associated shunt trip mechanism or, alternatively, directly by the polarized magnetic relay.

It is well known that the transistorized electronic type of earth leakage device, as well as the polarized relay type of device, has advantages but also disadvantages. It is generally accepted that the transistorized electronic type of device has the advantage of long term reliability with accurate stability and repeatability over wide ranges of ambient temperature and supply voltage, that it responds to low impedance neutral faults, is stable against mechanical shock or vibration, is unaffected by lightning surges and by short circuit current up to the rupturing limit of associated circuit breakers.

However, transistorized electronic type devices suffer from the disadvantage that a single phase unit will not operate under conditions of broken neutral and that a three phase unit will not operate if the shunt trip supply is lost.

A polarized relay type of device, on the other hand, has the advantage that it can still operate with a broken neutral and that a three phase device is unaffected by the loss of one supply phase. However, this type of device suffers from the disadvantages that a neutral fault on certain systems results in a drastic reduction in sensitivity even to the point of non-operation, that long term stability cannot be guaranteed in the same way as the transistorized electronic type of device and that it is more susceptible to mechanical shock than the transistorized type.

It will be appreciated from the foregoing that neither of the two basic types of earth leakage protective devices is entirely satisfactory to meet all possible operating conditions and requirements. In recent years the importance of earth leakage protection and the moral obligation of protecting human life has been receiving increasing recognition. In an effort to avoid the disadvantages of each of the two basic types of devices when used on its own, it has been suggested to provide the two types of devices together in parallel connection to serve as back-up protection one for the other. Improved results have been achieved but as far as applicants are aware, the results achieved have not been as satisfactory as might be desired.

It is accordingly an object of the present invention to provide a novel earth leakage protection system which applicants believe will give improved protection.

According to the invention a core balance earth leakage protective system includes a magnetic core; first and second sensing windings on the core; an electronic amplifier, the input to the amplifier being connected to the first sensing winding on the core and the output from the amplifier being electro-magnetically coupled with the core; a polarized magnetic relay including an actuating coil which is connected to the second sensing winding on the core, the relay being adapted to cause isolation of load windings associated with the core when the current flow through the relay coil exceeds a predetermined value.

A plurality of single or multi-turn load windings may be provided on the core. Alternatively, the core may be adapted for a plurality of load conductors to be passed through or round the core to constitute a plurality of single or multi-turn load windings. This aspect will be clear to a man skilled in the art.

When an earth fault occurs, the amplifier is energized by a signal derived from the first sensing winding and the polarized relay is energized from the second sensing winding.

With the arrangement according to the invention, the amplifier and the polarized relay are not merely connected together in parallel. Also, the amplifier is not adapted to be connected to its own tripping device, but utilizes the polarized relay to cause isolation of the load windings, the output of the amplifier being electro-magnetically coupled to the relay coil through the core and the second sensing winding so that when the amplifier is energized by an earth fault signal derived from the first sensing winding, the amplifier acts to energize the relay coil and cause isolation of the load windings if the predetermined current flow in the relay coil is exceeded. It will be appreciated that the second sensing winding acts as a coupling winding between the amplifier and the relay.

Since the relay coil is connected to the second sensing winding on the core, the coil can be independently energized by an earth fault signal derived directly from the second sensing winding. The arrangement is such that when an earth fault occurs, the energization of the relay coil by a signal derived from the second sensing winding due to the earth fault alone, reinforces the energization of the relay coil by a signal emanating from the amplifier. This normally increases the sensitivity of the system and the overall gain that can be achieved.

In a preferred embodiment of the invention, the amplifier part of the system is adapted to be more sensitive to earth faults than the polarized relay part, so that normally isolation of the load windings would be caused by energization of the relay coil from the amplifier before sufficient energization of the relay coil would be obtained from a signal derived from the second sensing winding as a result of an earth fault alone. In other words, the advantages of an electronic amplifier protective device can normally be relied upon, the polarized relay part being relied upon to act independently in the event of the amplifier part becoming inoperative due to loss of supply or any other cause.

The amplifier is preferably of the transistorized type and may be of conventional design. The amplifier may derive its power supply from the load conductors which is protected by the earth leakage protective system.

The output from the amplifier may be connected to a separate coupling winding on the core in order electro-magnetically to couple the output with the core.

Preferably, the output from the amplifier is connected to the first sensing winding or part thereof, such as by impedance coupling.

Preferably also, the winding on the core to which the output from the amplifier is connected, forms part of a regenerative feedback circuit.

It will be appreciated that a transformer coupling is provided between the amplifier and the relay coil through the core. This has several advantages. For example, a small relay coil having a low impedance may be used, the transformer coupling providing impedance matching. This facilitates miniaturization. Further, the level of an actuating signal applied to the relay coil can be enhanced, particularly when a regenerative feedback system is used. This increases the sensitivity of the system and the overall gain that can be achieved.

A regenerative feedback system coupled to the core has the further advantage that magnetic set in the core can be overcome or at least minimized.

With a system according to the invention a sensitive system with excellent long term reliability and stability can be obtained without supersensitive individual circuit components being required.

For a clear understanding of the invention, a preferred embodiment of the invention will now be described by way of example with reference to the accompanying diagrammatic circuit diagram.

Load 1 is connected by load conductors 2, 3, to the line and neutral terminals 4, 5 respectively of a 3-phase alternating current power supply through circuit breaker 6. Load conductors 2, 3 are connected to or constitute load windings 7, 8 respectively on a toroidal magnetic core 9.

Transistorized electronic amplifier 10 of conventional design is connected to power supply circuit 11, which in turn, is connected between load conductors 2, 3. The input terminals 12, 13 of amplifier 10 are connected to a first sensing winding 14 on core 9 and the output terminals 13, 15 of amplifier 10 are connected across a portion of first sensing winding 14, the arrangement being such that an impedance coupled regenerative feedback circuit is obtained. This aspect will be clear to a man skilled in the art.

Polarized relay 16 includes an actuating coil (not shown) which is connected to second sensing winding 17 on magnetic core 9 and an armature (not shown) which is adapted directly or indirectly to cause tripping of circuit breaker 6 when current which flows through the relay coil and which is derived from the second sensing winding 17, exceeds a predetermined value.

The amplifier part of the system is more sensitive to monitored earth fault signals derived from an unbalance in the algebraic sum of the negative phase sequence components of the currents flowing in load conductors 2 and 3 due to earth fault current flow, than the polarized relay part. In other words, the earth fault current required to cause tripping of circuit breaker 6 under the influence of the amplifier part of the system is smaller than the earth fault current that is necessary to cause tripping of the circuit breaker 6 under the influence of the polarized relay part on its own.

In the event of an earth fault occurring with the amplifier part in fully operative condition, the first sensing winding 14 applies a monitored earth fault signal to the input of amplifier 10, thereby to produce an amplified output which is transferred electro-magnetically through first sensing winding 14 or part thereof and core 9 to second sensing winding 17 and which is applied from second sensing winding 17 to the relay coil to energize the latter. Additionally, second sensing winding 17, additively applies to the relay coil an earth fault signal which it has monitored independently. When the resultant current flow through the relay coil exceeds the predetermined level, the relay causes circuit breaker 6 to trip and isolate load 1 from the power supply.

In the event of the amplifier part of the protective system becoming inoperative, such as may be caused by a broken neutral which would interrupt the power supply to the amplifier 10, the polarized relay part acts independently on its own to cause tripping of the circuit breaker 6 when the current which flows through the relay coil and which is derived from an earth fault signal monitored by second sensing winding 17, exceeds the predetermined value.

It will be appreciated that many variations in detail are possible without departing from the scope of the appended claims. Any suitable polarized relay may be used, such as that disclosed in our U.S. Pat. No. 3,475,708 dated Oct. 28, 1969.

In the case where amplifier 10 employs an auto-transformer type of output coupling, terminals 12, 13 may also constitute the output terminals of amplifier 10, the amplifier output from terminals 12, 13 being connected across the whole of first sensing winding 14.

As another alternative, a separate coupling winding (not shown) may be provided on core 9 and the output terminals 13, 15 or 12, 13 (as the case may be) of amplifier 10 connected across the separate coupling winding. The coupling winding to which the output of amplifier 10 is connected, may form part of a regenerative feedback circuit. This will be clear to a man skilled in the art.

A non-regenerative circuit may also be used for coupling the output of the amplifier to the core, but with such an arrangement some form of bias on the amplifier may be required.

A core balance earth leakage protective system according to the invention is applicable to poly-phase power supply systems as well as to single phase power supply systems.

We claim

1. A core balance earth leakage protective system including a magnetic core; first and second sensing windings on the core; an electronic amplifier, the input to the amplifier being connected to the first sensing winding on the core and the output from the amplifier being electro-magnetically coupled with the core; a polarized magnetic relay including an actuating coil which is connected to the second sensing winding on the core, the relay being operative to cause isolation of load windings associated with the core when the current through the relay coil exceeds a predetermined value.

2. A system as claimed in claim 1, wherein a plurality of load windings are provided on the core.

3. A system as claimed in claim 1, wherein the core is arranged for a plurality of load conductors to be passed through or round the core to constitute a plurality of load windings.

4. A system as claimed in claim 1, wherein the amplifier-part of the system is arranged to be more sensitive to earth faults than the polarized relay part.

5. A system as claimed in claim 1, wherein the amplifier is of solid state electronic type.

6. A system as claimed in claim 1, wherein the output from the amplifier is connected to a separate coupling winding on the core, thereby electro-magnetically to couple the output with the core.

7. A system as claimed in claim 1, wherein the output from the amplifier is connected to at least part of the first sensing winding, thereby electro-magnetically to couple the output with the core.

8. A system as claimed in claim 6, wherein the coupling winding forms part of a regenerative feedback circuit.

9. A system as claimed in claim 7, wherein the output from the amplifier is connected to the first sensing winding by impedance coupling.

10. A system as claimed in claim 7, wherein the first sensing winding forms part of a regenerative feedback circuit.

* * * * *